United States Patent Office 3,423,374
Patented Jan. 21, 1969

3,423,374
PREPARATION OF LIQUID POLYSULFIDE POLYMERS AND THEIR PRODUCTS
Faber B. Jones and Billy D. Simpson, Bartlesville, Okla., assignors to Phillips Petroleum Company, a corporation of Delaware
No Drawing. Filed July 15, 1966, Ser. No. 565,373
U.S. Cl. 260—79                         10 Claims
Int. Cl. C08g 25/00, 23/00; C07c 149/26

ABSTRACT OF THE DISCLOSURE

A crosslinkable liquid polysulfide polymer is produced by reacting (1) sulfur, (2) a polythiol having the formula $R(SH)_n$, wherein R is a hydrocarbon radical selected from the group consisting of saturated aliphatic, saturated cycloaliphatic, and aromatic radicals and combinations thereof, said hydrocarbon radical having from 3 to 20 carbon atoms and having a valence equal to $n$, and $n$ is an integer of at least 3, and (3) a dithiol selected from the group consisting of 3-(2-mercaptoethyl)cyclohexanethiol, 4-(2-mercaptoethyl)cyclohexanethiol and mixtures thereof. The liquid polymer can be placed in a joint and cured to produce a solid caulking or sealant material.

---

This invention relates to a method for the preparation of novel liquid polysulfide polymers, the resulting polymeric materials and the cured products.

Sealants and caulks are materials employed as gap-filling materials in the construction of various structural assemblies and to provide leak proof joints. Until recent times, the major sealant used in buildings was putty, made by thickening boiled linseed oil with calcium carbonate. It was cheap and was adequate for sealing small panes of glass or other structural members. However, with the increasing use of larger glass panes, especially in commercial buildings, more elastic sealing materials were required. Oleoresinous caulks and polybutenes filled this need. These materials are somewhat more fluid than putty and are applied by means of a gun.

Recently, with the advent of curtain-wall construction, materials are required to seal the joints between large metal to metal sections, metal to glass sections, etc. In this type of construction wind pressures and temperature variations create strains which can be accommodated only by elastomeric materials having high elongations. Age hardening, characteristic of oleoresinous materials, has to be minimized to provide materials which will stand up for long periods of time. With large movements of the joints, adhesion also becomes very important. These more rigid requirements have caused the development of a new series of sealants, compounded from elastomeric materials such as polysulfides, polyurethanes, silicones, acrylics, polybutenes, and butyl rubber.

While several polysulfides have been made available commercially, it has become desirable to find a polysulfide which is more suitable to the caulking and sealing requirements.

In accordance with this invention, a crosslinkable liquid polysulfide polymer is prepared by reacting sulfur, a polythiol having at least three mercapto groups, and at least one dithiol selected from the group consisting of 3-(2-mercaptoethyl)cyclohexanethiol and 4-(2-mercaptoethyl)cyclohexanethiol. The liquid polymer is curable to a solid composition that displays greater adhesion strength, tensile strength and elongation than do the cured polymers obtained from existing commercially available polysulfides.

Accordingly, it is an object of the invention to provide a new and useful polysulfide polymer. Another object of the invention is to provide a method for preparing a liquid polysulfide polymer having improved properties. Another object of the invention is to provide an improved caulking and sealing composition having greater adhesion strength. Yet another object of the invention is to provide an improved caulking and sealing composition having greater tensile and elongation strength than polysulfide compositions presently available.

Other objects, aspects and advantages of the invention will be apparent from a study of the specification and the appended claims to the invention.

The polythiol utilized in the process of the invention can be represented by the formula:

$$R(SH)_n$$

where R is a hydrocarbon radical selected from the group consisting of saturated aliphatic, saturated cycloaliphatic, and aromatic radicals, and combinations thereof such as aryl-substituted aliphatic radicals, alkyl-substituted aromatic radicals, and the like, said hydrocarbon radical having from 3 to about 20 carbon atoms and having a valence equal to $n$, and $n$ is an integer of at least three to provide crosslinkage sites. While $n$ will generally be in the range of 3 to 6, it is presently preferred that $n$ be 3 or 4 because of the greater availability of the compounds. Examples of polythiols suitable for use in accordance with the invention include 1,2,3-propanetrithiol, 1,2,4-butanetrithiol, 1,2,3,4-butanetetrathiol, 1,2,3-pentanetrithiol, 3-methyl-1,2,3-heptanetrithiol, 1,2,10-decanetrithiol, 1,2,3,5,6-dodecanepentathiol, 1,2,4,5,7,8-hexadecanehexathiol, 2,3,5,8-eicosanetetrathiol, 1,2,3-cyclopentanetrithiol, 1,2,3,4-cyclohexanetetrathiol, 2-ethyl-1,2,3,4-cyclooctanetetrathiol, 2-(mercaptomethyl)-1,3-cyclopentanedithiol, 2-cyclohexyl-1,3,4-butanetrithiol, 1,2,3-benzenetrithiol, 1,2,4,5-benzenetetrathiol, toluene-2,3,4-trithiol, toluene-α,2,3,4-tetrathiol, and 2-phenyl-1,3,6-hexanetrithiol, and mixtures thereof.

The dithiol utilized in the process of the invention is selected from the group consisting of 3-(2-mercaptoethyl)cyclohexanethiol, 4 - (2 - mercaptoethyl)cyclohexanethiol, and combinations thereof. The presently preferred material is a mixture of 3-(2-mercaptoethyl)cyclohexanethiol and 4-(2-mercaptoethyl)cyclohexanethio as prepared in accordance with the process of Example I of Rector P. Louthan, U.S. 3,050,452, issued Aug. 21, 1962. While the mixture of dithiols can be a distilled fraction, it is also within the contemplation of the invention to utilize the dithiol in admixture with other materials, such as the crude product of Example I of U.S. 3,050,452. However, it is desirable to minimize the presence of reactive monofunctional compounds as these materials tend to prematurely terminate the polymer growth.

The mole ratio of polythiol containing at least three mercapto groups to dithiol can vary over a broad range, depending in part on the particular polythiol employed, but will generally be in the range of about 0.001:1 to about 0.1:1, and preferably will be in the range of about 0.005:1 to about 0.05:1. The ratio of dithiol to surfur will generally be in the range of about 0.5 to about 4 moles of dithiol per gram-atom of sulfur and will preferably be in the range of about 0.8 to about 2 moles of dithiol per gram-atom of sulfur.

The polythiol, dithiol and sulfur can be reacted in the presence or absence of a catalyst and in the presence or absence of a solvent. When desired, a basic catalyst can be utilized to accelerate the reaction of the sulfur with the thiols. The presently preferred catalysts are amines, ammonia, and the oxides, hydroxides, and carbonates of lithium, sodium, potassium, rubidium, cesium, magnesium, calcium, strongtium, and barium. When desired, a solvent such as chloroform, carbon tetrachloride, benzene, toluene, xylene and the like can be employed. While the order of addition of the sulfur, polythiol and dithiol can be varied, it is presently preferred to premix the polythiol and dithiol to provide a more uniform polymer. All of the sulfur can be introduced into the reaction initially or the sulfur can be added incrementally. Although the temperature of the reaction can vary within a considerable range, it will generally be in the range of about −20° C. to about 250° C. and will usually be in the range of about 20° C. to about 200° C. The reaction time also can vary considerably, depending in part on the temwas either added initially at this point or incrementally over ⅓ to 4 hours at room temperature unless otherwise noted. After the initial evolution of hydrogen sulfide had subsided, the reaction was finished by heating within the range of 60 to 200° C. In some runs steam or vacuum stripping during the finishing step was used to remove low boiling materials. The description and results of these runs are set forth in Table I.

TABLE I.—PREPARATION OF POLYSULFIDE POLYMERS

| Run | Moles Dithiol per g., Atom S | Catalyst | Method of S Addition | Total Reaction Time, hr.[4] | Finishing Temp., °C. | Finishing Time, hr. | Method of Stripping | Mercaptan Sulfur, Wt. percent [5] | Molecular Weight [6] | Brookfield Visc., cps.[7] |
|---|---|---|---|---|---|---|---|---|---|---|
| 1 | 1.18 | Bu³N [1] | Initially | 8.2 | 60–180 | 7.2 | Vacuum | 7.38 | 867 | 335,000 |
| 2 | 1.07 | Bu³N | Incrementally | 6 | 110–192 | 5.75 | do | 2.84 | 2,250 | |
| 3 | 1.18 | Bu³N | do | 3.5 | 170 | 1.5 | do | 8.1 | 790 | 212,000 |
| 4 | 1.20 | Bu³N | do | 6 | 86–180 | 2 | do | 8.72 | 640 | 88,000 |
| 5 | 1.20 | DMP-30 [2] | Initially | 6.25 | 95–110 | 5.75 | None | 9.8 | 655 | 21,750 |
| 6 | 1.20 | DMP-30 | do | 6.7 | 85–180 | 6 | do | 10.7 | 598 | 17,250 |
| 7 | 1.20 | DMP-30 | do | 5.8 | 100–120 | 5.5 | Steam | 9.3 | 689 | |
| 8 | 1.06 | DMP-30 | do | 6 | 105–120 | 5 | None | 11.1 | 577 | 14,750 |
| 9 | 1.06 | DMP-30 | do | 6 | 100–110 | 5 | do | 9.8 | 653 | 6,760 |
| 10 | 1.06 | DMP-30 | Incrementally | 6.5 | 100–108 | 4 | do | 7.86 | 813 | 30,550 |
| 11 | 1.06 | DMP-30 | Incrementally [3] | 8 | 93–105 | 8 | do | 8.13 | 788 | 83,000 |

[1] Bu³N is tri-n-butylamine. [2] DMP-30 is 2,4,6-tris(dimethylaminomethyl)phenol. [3] The sulfur was added incrementally at 95° C. [4] Total reaction time includes the finishing time. [5] Determined by titrating an acetone solution of the polymer with a standard solution of mercuric perchlorate in acetone, using 4,4′-bis(dimethylamino)thiobenzophenone as indicator. [6] Approximate value calculated using the formula:

$$MW = \frac{64 \times 100}{wt.\ percent\ mercaptan\ sulfur}.$$

[7] Viscosity of the polymer was determined at 26° C. using a Model RVT-E Brookfield Viscometer.

perature and whether a catalyst is utilized, but will generally be in the range of about 1 minute to about 2 days and will usually be in the range of about 5 minutes to about 12 hours. The pressure need be only sufficient to maintain the reactants and/or solvent substantially in the liquid phase.

The molecular weight of the liquid polymeric material produced by the reaction can vary in a wide range but generally will be in the range of 400 to about 10,000, depending upon the ratios of the polythiol, dithiol and sulfur and upon the conditions of the reaction, and more usually will be in the range of about 600 to about 2250. The Brookfield viscosity of the liquid polymer ranges from about 1000 to about 500,000 cps., preferably about 2000 to about 350,000 cps. The liquid reaction product can be processed, as by stripping, to remove undesired low boiling materials.

The liquid polymers can be cured to solid materials by utilizing any of the curing agents conventionally employed for existing polysulfide polymers, such as air, lead dioxide, zinc oxide, cupric oxide, mercuric oxide, stannic oxide, ferric oxide, lead stearate, zinc laurate, zinc acetate, ammonium persulfate and the like. The curing time will vary with the polymer, the curing agent and the temperature. Fillers such as carbon black, zinc sulfide, titanium dioxide, calcium carbonate and aluminum oxide can be incorporated into the polymer to strengthen the cured polymer and/or to reduce the cost. Other reinforcing or extending fillers, pigments, resins and/or plasticizers can be incorporated into the polymer as desired. A curing agent can be admixed with the liquid polysulfide polymer, and the admixture applied to a joint before the reaction of the liquid polysulfide polymer with the curing agent is completed to seal the joint.

The cured products produced in accordance with the invention have improved tensile strength, elongation and adhesion.

The following examples are presented in further illustration of the invention and should not be construed to unduly limit the invention.

Example I

A series of runs were conducted wherein an admixture of 3-(2-mercaptoethyl)cyclohexanethiol and 4-(2-mercaptoethyl)cyclohexanethiol was combined with 1,2,3-propane trithiol and a tertiary amine in a flask which was fitted with a stirrer, a thermometer and a gas outlet. The mole ratio of 1,2,3 propane trithiol to the admixture of dithiols was approximately 0.015:1. The weight of sulfur calculated to give the desired molecular weight Example II The liquid polysulfide polymer prepared in run 4 of Example 1 was cured at room temperature with lead dioxide in the presence of 0.2 part by weight of cobalt linoresinate per 100 parts by weight of polymer. Thiokol LP-2, a commercial polysulfide polymer was cured at room temperature with lead dioxide, using 10 parts by weight of stearic acid per 100 parts by weight of lead dioxide. The stearic acid was used to retard the curing of the Thiokol LP-2 to a desirable rate. In each instance the amount of lead dioxide utilized was 10% in excess of the amount of lead dioxide calculated to theoretically react with all the thiol groups, i.e., the mole ratio of lead dioxide to mercapto groups was 0.55 to 1. The tensile strength, ultimate elongation and peel strength of each of the cured products were determined and the results are set forth in Table II.

TABLE II.—COMPARISON OF PROPERTIES

| | Cured Polysulfide of Run 4, Example I | Cured LP-2 |
|---|---|---|
| Tensile Strength, p.s.i.[1] | 348 | 129 |
| Ultimate Elongation, Percent | 265 | 168 |
| Peel Strength, lb/in. Width: [2] | | |
| Aluminum | 18 | 9 |
| Glass | 2.2 | 1.5 |

[1] Tension Testing of Vulcanized Rubber. ASTM Method D412-62T. The formulated polymer was poured into a .0625×2.5×6 inch mold and allowed to cure. Dumbbell specimens were cut from the cured slabs using a die with reduced section 0.750 inch in length and 0.125 inch wide. Bench marks 0.50 inch apart were placed on the specimens using white ink. Testing was done on an Instron tester using a crosshead speed of 20 in./min. The load and percent elongation at the instant of failure were noted. Tensile strength was calculated by dividing the breaking load by the dimensions of the specimen.
[2] Peel or Stripping Strength of Adhesives. ASTM Method D903-49. The formulated polymer was applied to the lower half of a 12 in. length of 30 oz cotton duck by means of an 18 mil film applicator (Bird type). Aluminum strips (2024 alloy), or glass strips, 1×6 in. which had been chemically cleaned in caustic and chromic acid solutions were carefully placed on the polymer coating and firm contact was made. After a suitable curing time the backing was carefully trimmed along the sides of the strips leaving a free 1×6 inch strip of duck on the specimen. Any flash around the strips was removed. The free end of duck was peeled back approximately 1 inch and the glass or aluminum strip was clamped in the upper jaw of an Instron tester. The free cloth end was pulled bake on itself and clamped in the lower jaw. The duck was then stripped at a rate of 6 in./min. The average force necessary to strip the specimen was taken as the peel strength. This is expressed in lb/in. width.

In a sealant material, tensile strength, elongation and adhesion are very important. As shown above, the tensile strength, ultimate elongation and peel strength from aluminum and glass of the cured polysulfide polymers prepared in accordance with the present invention are superior to those of one of the commercially available polymers.

Reasonable variations and modifications are possible within the scope of the foregoing disclosure and the appended claims to the invention.

We claim:

1. A process comprising reacting (1) sulfur, (2) a polythiol having the formula $R(S)_n$, wherein R is a hydrocarbon radical selected from the group consisting of saturated aliphatic, saturated cycloaliphatic, and aromatic radicals and combinations thereof, said hydrocrbon radical having from 3 to 20 carbon atoms and having a valence equal to $n$, and $n$ is an integer of at least 3, and (3) a dithiol selected from the group consisting of 3-(2-mercaptoethyl)cyclohexanethiol, 4-(2-mercaptoethyl)cyclohexanethiol and mixtures thereof, to produce a liquid crosslinkable polysulfide polymer.

2. A process in accordance with claim 1 wherein $n$ is an integer in the range of 3 to 6.

3. A process in accordance with claim 1 wherein the mole ratio of said polythiol to said dithiol is in the range of about 0.001:1 to about 0.1:1, and the ratio said dithiol to said sulfur is in the range of about 0.5 to about 4 moles of dithiol per gram-atom of sulfur.

4. A process in accordance with claim 1 wherein the reaction is conducted at a temperature in the range of about −20° C. to about 250° C. for a time in the range of about 1 minute to about 2 days at a pressure sufficient to maintain the reactants in the liquid phase.

5. A process in accordance with claim 2 wherein the mole ratio of said polythiol to said dithiol is in the range of about 0.005:1 to about 0.05:1, the ratio of said dithiol to said sulfur is in the range of about 0.8 to about 2 moles of said dithiol per gram-atom of sulfur, and the reaction is conducted in the presence of a solvent and a basic catalyst at a temperature in the range of about 20° C. to about 200° C. for a time in the range of about 5 minutes to about 12 hours at a pressure sufficient to maintain the reactants and said solvent in the liquid phase.

6. A process in accordance with claim 5 further comprising reacting the resulting liquid polysulfide polymer with a curing agent to produce a solid composition.

7. A process in accordance with claim 6 further comprising applying said liquid polysulfide polymer to a joint to seal said joint before the reaction with said curing agent is completed.

8. A solid composition having improved tensile strength, elongation and adhesion prepared in accordance with the process of claim 6.

9. A composition in accordance with claim 8 wherein said polythiol is 1,2,3-propanetrithiol.

10. A liquid polysulfide polymer prepared in accordance with the method of claim 1.

References Cited

UNITED STATES PATENTS

| | | | |
|---|---|---|---|
| 3,037,967 | 6/1962 | Louthan | 260—79 |
| 3,050,452 | 8/1962 | Louthan | 260—79 |
| 3,055,946 | 9/1962 | Warner | 260—608 |
| 3,219,638 | 11/1965 | Warner | 260—79 |
| 3,305,536 | 2/1967 | Warner | 260—79 |

DONALD E. CZAJA, *Primary Examiner.*

M. T. MARQUIS, *Assistant Examiner.*

U.S. Cl. X.R.

260—608, 609, 37; 117—124, 135.1

UNITED STATES PATENT OFFICE
CERTIFICATE OF CORRECTION

Patent No. 3,423,374

January 21, 1969

Faber B. Jones et al.

It is certified that error appears in the above identified patent and that said Letters Patent are hereby corrected as shown below:

Column 5, line 6, "$R(S)_n$" should read -- $R(SH)_n$ --; line 20, after "ratio" insert -- of --.

Signed and sealed this 2nd day of June 1970.

(SEAL)
Attest:

Edward M. Fletcher, Jr.
Attesting Officer

WILLIAM E. SCHUYLER, JR.
Commissioner of Patents